(12) United States Patent (10) Patent No.: US 8,913,725 B1
Torgersrud (45) Date of Patent: *Dec. 16, 2014

(54) RESIDENCE-BASED CALLING RATES, SYSTEM AND METHOD

(71) Applicant: Telmate, LLC, San Francisco, CA (US)

(72) Inventor: Richard Torgersrud, San Francisco, CA (US)

(73) Assignee: Telmate, LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/452,495

(22) Filed: Aug. 5, 2014

Related U.S. Application Data

(63) Continuation of application No. 13/969,455, filed on Aug. 16, 2013, now Pat. No. 8,811,582.

(51) Int. Cl.
*H04M 15/00* (2006.01)
*H04M 15/08* (2006.01)
*H04M 3/42* (2006.01)

(52) U.S. Cl.
CPC .......... *H04M 15/08* (2013.01); *H04M 3/42357* (2013.01)

USPC .............................. 379/114.21; 379/114.02

(58) Field of Classification Search
CPC ...... H04M 15/00; H04M 15/07; H04M 15/08
USPC .............. 379/114.02, 114.21, 114.22, 114.24
See application file for complete search history.

(56) References Cited

U.S. PATENT DOCUMENTS

| | | | |
|---|---|---|---|
| 7,391,855 B2 | 6/2008 | Winstead | |
| 7,961,858 B2 | 6/2011 | Polozola | |
| 8,811,582 B1 * | 8/2014 | Torgersrud | 379/114.21 |
| 2003/0112935 A1 | 6/2003 | Brown | |
| 2009/0304166 A1 | 12/2009 | Hodge | |

* cited by examiner

*Primary Examiner* — Quoc D Tran
(74) *Attorney, Agent, or Firm* — Jonathan P. Kudla

(57) ABSTRACT

An exemplary embodiment provides for a computer-implemented method for rating telephone calls originating from a secure facility. The method includes receiving a destination number, of a called party, for a telephone call from the secure facility and determining, based on the destination number, if the called party is pre-verified wherein pre-verified includes at least a billing address of the called party. Next, a rate for the telephone call is then determined based on the billing address of the called party, if the called party is pre-verified.

3 Claims, 13 Drawing Sheets

RESIDENCE-BASED CALLING RATES, SYSTEM AND METHOD

CROSS-REFERENCE TO RELATED APPLICATIONS

This application is a continuation of copending U.S. patent application Ser. No. 13/969,455, entitled "Residence-Based Calling Rates, System and Method," and filed on Aug. 16, 2013, the contents of which are hereby incorporated by reference in their entirety, for all purposes.

This application is also related to co-pending U.S. patent application Ser. No. 13/602,837, entitled "Personal Allowed Number System" and is also related to co-pending U.S. patent application Ser. No. 13/843,461, entitled "Call Management for Secure Facilities," both of which are hereby incorporated by reference in their entirety, for all purposes.

BACKGROUND

Controlled facilities, such as a jail, prison, secure detention environments, detention facility, secured hospital, or addiction treatment facility, house large populations of individuals in confinement, which presents unique administrative challenges. In such detention environments, detained individuals, such as prisoners, offenders, convicts, military personnel, patients, government cleared personnel, or other detainees, frequently desire to communicate with individuals outside the detention environment such as friends or family members.

Detainee contact with the outside world is further desirous as such contact often can lead to improved detainee behavior and can also contribute to a lower recidivism rate, once detainees are released to the outside world.

However, controlled facility officials also have valid security concerns regarding detainee communications. The cost to address these concerns may sometimes at least partially be passed on to the detainee and the people that communicate with him. That being said, an equally-important component is a desire to provide fair-priced phone calls, without loopholes, to ensure delivery of secure communication systems yet not gouge the detainee and/or the ones to whom they communicate.

Current pricing mechanisms, in the field of telephone communications, call pricing is based on a number of different variables, singularly or in various combinations. One variable that may be utilized are pre-defined geographic calling zones which are divided into the categories shown in Table I, below. Generally speaking, local indicates a shortest distance call, intraLATA is of a longer length, then interLATA, etc.

TABLE I

| Geographic Calling Zone Category | Definition |
|---|---|
| local | Calls within a local calling area, usually defined by a list of specific calling prefixes or exchange codes (the first three numbers that follow the area code.) Related, the area code is sometimes referred to as the NPA of a telephone number where NPA stands for Numbering Plan Area code. Similarly, NXX is sometimes used to refer to the aforementioned calling prefix or exchange code.) |
| intraLATA | Calls within a geographic area or region, as pre-defined by the FCC, in which a local operating telephone company typically provides local service, long distance service, and access to an entire telephone network. |

TABLE I-continued

| Geographic Calling Zone Category | Definition |
|---|---|
| interLATA | Calls between a geographic area or region. |
| interstate | Generally, calls that cross over one or more state lines. |
| international | Calls between the USA and foreign locations. |

Another pricing variable is distance, between a caller and the called party, and is sometimes referred to as 'mileage bands'. Distance between two calling parties is typically tied to a distance between approximate geographic locations associated with the NPA-NXXs of the involved telephone numbers (the first three digits of the telephone number, also known as the area code, plus the next three numbers.)

Other pricing variables include payment methods such as collect and pre-paid calling card, day and time of day of a call, type of involved device for placing or receiving a call (cell phone, land line, VoIP, etc), length of call and a flat connection fee.

While these existing mechanisms have sufficed, and still do suffice in many respects, a need is becoming apparent for increased precision regarding a physical location, at which a person makes and receives phone calls, and the related distance between callers. In addition, application of newer communication technologies has made the existing mechanisms woefully lacking in many related aspects.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

The claimed embodiments provide for a computer-implemented method for rating telephone calls originating from a secure facility. The method includes receiving a destination number, of a called party, for a telephone call from the secure facility and determining, based on the destination number, if the called party is pre-verified wherein pre-verified includes at least a billing address of the called party. Next, a rate for the telephone call is then determined based on the billing address of the called party, if the called party is pre-verified.

In another implementation, the claimed embodiments provide another computer-implemented method for rating telephone calls which includes receiving a destination number, of a called party, for a telephone call, determining a rate for the telephone call based on a best-known address of the called party and selecting the determined rate to be billed to the called party.

In yet another implementation, the claimed embodiments provide for a computer-implemented method for rating telephone calls that includes receiving a destination number, of a called party, for a telephone call, determining a first rate for the telephone call based on the destination number, determining a second rate for the telephone call based on a best-known address of the called party, comparing the first rate to the second rate and selecting the first rate or the second rate, based on the comparison, to be billed to the called party.

In addition to the exemplary aspects and embodiments described above, further aspects and embodiments will become apparent by reference to the drawings and by study of the following descriptions.

BRIEF DESCRIPTION OF THE DRAWINGS

Exemplary embodiments are illustrated in referenced figures of the drawings. It is intended that the embodiments and figures disclosed herein are to be considered illustrative rather than limiting.

DETAILED DESCRIPTION

The claimed embodiments provide for residence-based rating of phone calls. That is, while a phone number may appear to be a number utilized in a specific area, it may, for example, be associated with a mobile device and is used in an area not associated with the telephone number's area code. However, where a phone bill is sent may be a more accurate locational characterization of where the mobile device is being utilized. In that same general idea of rating based on where a call physically is received, other embodiments contemplate doing just that—physical determination of where a call is received, or made, and rating based on that type of criteria.

For the purposes of this disclosure, the term 'rating' refers to the act of calculating the cost of a phone call and may be based on the previously mentioned pricing variables.

Exemplary methods for utilizing the claimed residence-based rating embodiments will be further described in a later section. Firstly, FIGS. 1-6 will now be presented and then followed by FIGS. 7-10 which illustrate pre-verification methods.

FIGS. 1-6 are schematic diagrams of an example secure facility call management system that may be used in conjunction with the claimed embodiments.

Figure 1:
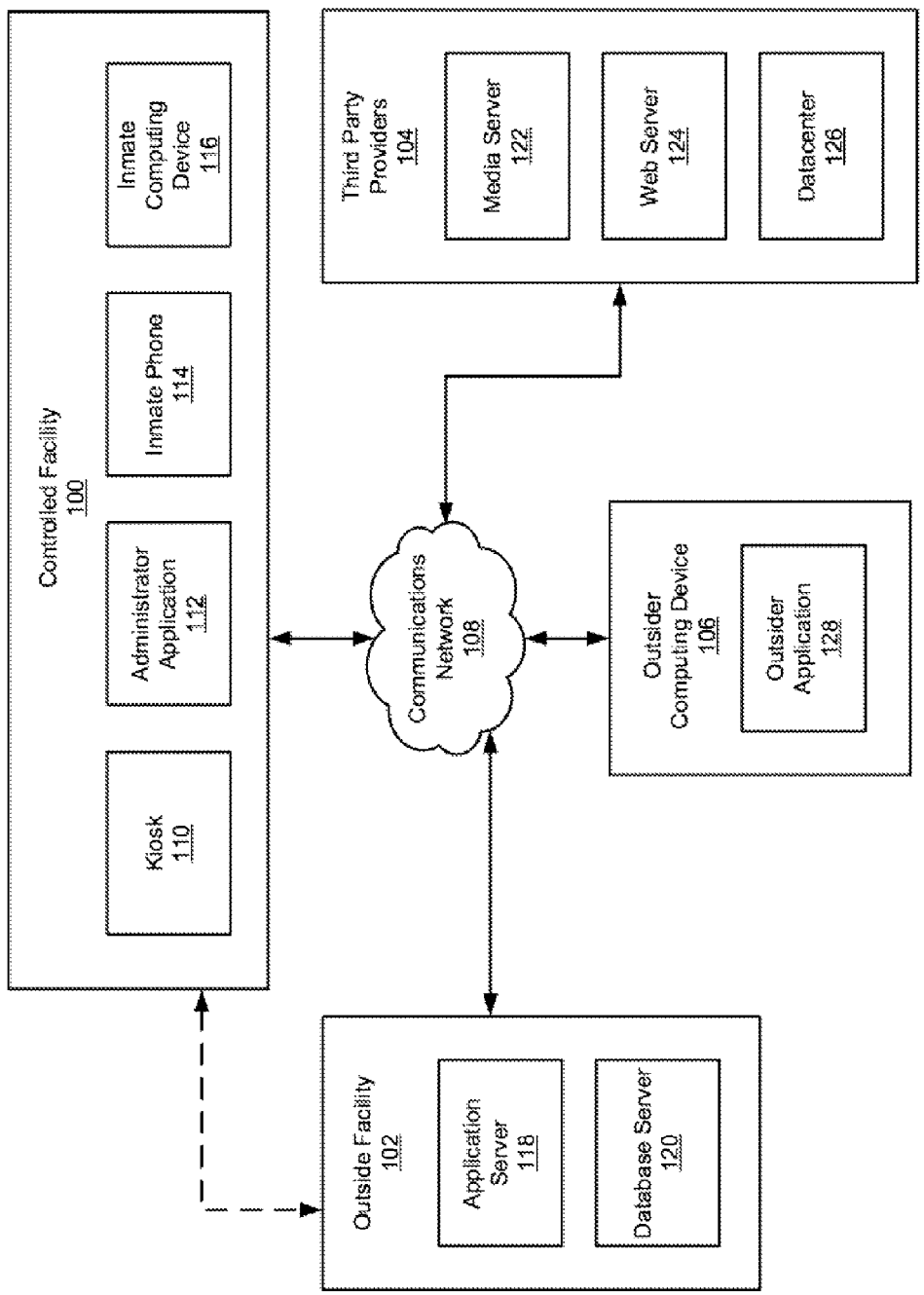
FIGS. 1-6 are schematic diagrams of an example secure facility call management system that may be used in conjunction with the claimed embodiments.

FIG. 1 shows a diagram of a system in accordance with at least one implementation of the claimed embodiments. As shown in FIG. 1, the system includes a controlled facility (100), an outside facility (102), third party providers (104), and an outsider computing device (106) each communicatively coupled to a communications network (108). The controlled facility (100) may include, but is not limited to, a kiosk (110), an administrator application (112), an inmate phone (114), and an inmate computing device (116). The outside facility (102) may include an application server (118) and a database server (120). The third party providers (104) may include a media server (122), a web server (124), and a datacenter (126). The outsider computing device (106) may include an outsider application (128).

In at least one implementation of the claimed embodiments, a controlled facility (100) is an access-restricted location. Examples of controlled facilities (e.g., controlled facility (100)) include, but are not limited to, detention environments (e.g., jails, prisons, etc.), immigration detention centers, military centers, government secure sites, law enforcement holding structures, secure business complexes, and psychiatric hospitals.

In at least one implementation of the claimed embodiments, an inmate is a person within a controlled facility (100) who is subject to one or more restrictions, primarily to his or her freedom or rights. Examples of inmates include, but are not limited to, prisoners, wards of the state, parolees, employees working in a secure business complex, temporary or long-term internees, patients, military personnel, uncharged suspects, and refugees. Inmate restrictions may be part of a court-imposed sentence on an inmate, while others may be specific to the controlled facility (100) in which the inmate resides. Restrictions may include limitations on an inmate's physical movement (i.e., physical restrictions) and limitations on the inmate's ability to communicate (i.e., communication restrictions). Communication restrictions include inmate use restrictions, inmate target restrictions, and device use restrictions.

In at least one implementation of the claimed embodiments, inmate use restrictions are limitations on an inmate's general ability to communicate with visitors and/or outsiders. Inmate use restrictions may include, for example, periods of time in which an inmate is not allowed to communicate with outsiders or visitors (e.g., between 10 PM and 8 AM, during an imposed one-week punitive period, etc.) and limitations based on lack of funds (e.g., insufficient commissary account balance to initiate a communication).

In at least one implementation of the claimed embodiments, inmate target restrictions are limitations on the target or source of a communication with the inmate. Inmate target restrictions may be specific outsiders or visitors with whom the inmate is not allowed to communicate (e.g., the victim of a crime perpetrated by the inmate, etc.). Inmate target restrictions may also include types of people with whom the inmate is not allowed contact (e.g., outsiders who are ex-cons, minors under the age of 18, etc.).

In at least one implementation of the claimed embodiments, device use restrictions are restrictions based on the condition or state of the communication device used by the inmate. Device use restrictions include, for example, limitations based on the location of the inmate's mobile device, limitations imposed based on a determination that the device has been tampered with, etc.

In at least one implementation of the claimed embodiments, an outsider is a person outside the controlled facility (100) who may be the source or target of a communication with an inmate. An outsider who enters the controlled facility (100) for the purpose of communicating with an inmate is referred to as a visitor.

In at least one implementation of the claimed embodiments, the kiosk (110) is a computing system with functionality to facilitate communication between an inmate and a visitor or outsider. Such communication facilitation may include creating a system identity data item or secure social networking account, adding or importing contact information for outsiders with whom the inmate wishes to communicate, uploading media (e.g., photos, videos, audio, and text) to, or viewing media from, a secure social network, sending or receiving messages or other media, acting as an endpoint for voice and video communication between an inmate and a visitor or outsider, scheduling a communication, and managing a commissary or communications account. Further detail about kiosks (e.g., kiosk (110)) is provided in FIG. 2, FIG. 5A, FIG. 5B, and FIG. 6. Kiosks may also, in some implementations, be deployed outside of controlled facility 100.

In at least one implementation of the claimed embodiments, the administrator application (112) is a process or group of processes executing on a computing system with functionality to enable an administrator to create, remove, and/or enforce one or more restrictions on an inmate. In at least one implementation of the claimed embodiments, an administrator is a person associated with the controlled facility charged with enforcing one or more restrictions. Examples of administrators include, but are not limited to, prison guards, orderlies, wardens, prison staff, jailers, information technology technicians, system administrators, and law enforcement agents. Using the administrator application, an administrator may retrieve or alter the identity data item and/or secure social network account of an inmate, visitor, or outsider. Further detail about the administrator application (112) is provided in FIG. 2.

In at least one implementation of the claimed embodiments, the inmate phone (114) is a device with functionality to send and receive audio communications between an inmate and an outsider or visitor. In at least one implementation of the claimed embodiments, the inmate phone (114) is a stationary (i.e., non-mobile) device. Further, a single inmate phone (114) may be used by more than one inmate. Further detail about the inmate phone (114) is provided in FIG. 2.

In at least one implementation of the claimed embodiments, the inmate computing device (116) is a computing device with functionality to enable an inmate to communicate with a visitor or outsider. Specifically, the inmate computing device (116) may be used to send or receive text messages and/or initiate or receive voice or video calls. In at least one implementation of the claimed embodiments, the inmate computing device (116) also enables an inmate to access a secure social network. Specifically, the inmate computing device (116) may be used to upload media to, or view media from, a secure social network account of the inmate or another secure social network member. In at least one implementation of the claimed embodiments, the inmate computing device (116) is a mobile computing device (e.g., a smartphone, a laptop, a tablet, etc.). Further detail about the inmate computing device (116) is provided in FIG. 2 and FIG. 6.

In at least one implementation of the claimed embodiments, the elements within the controlled facility (100) are communicatively coupled to the communications network (108). In at least one implementation of the claimed embodiments, the communications network (108) is a collection of computing systems and other hardware interconnected by communication channels. The communications network (108) may include networks that are exclusively or primarily used for a single type of communication, such as a telephone network (e.g., Plain Old Telephone System (POTS)), and/or networks used for a wide array of communication types, such as the Internet through Voice over IP (VOIP). Communication channels used by the communications network (108) may include, for example, telephone lines, networking cables, wireless signals, radio waves, etc. Fees charged and payments received by the provider(s) of the communications network (108) may involve multiple parties, including a service provider of the outside facility (102), the management of the controlled facility (100), and provider(s) of the communications network (108). In at least one implementation of the claimed embodiments, fees may be split between multiple parties based on the terms of underlying agreements or contracts between the parties. Further, rebates, reimbursements, and/or refunds may be afforded to and paid to the management of the controlled facility (100) based on the terms of underlying agreements or contracts between the parties. For example, the management of the controlled facility (100) may receive a rebate from the service provider of the services provided to inmates based on such factors as the volume of use, the dollar amount, and/or the frequency of use.

In at least one implementation of the claimed embodiments, the outside facility (102) is a group of computing systems located outside of the controlled facility (100). Specifically, the outside facility (102) may house system elements with functionality to facilitate communication between inmates and outsiders, access communication data between inmates and outsiders, and enforce one or more restrictions imposed on inmates and inmate communications. In at least one implementation of the claimed embodiments, the outside facility (102) is connected directly to the controlled facility (100) bypassing a generally accessible communications network (communications network (108)). One or more of the components within the outside facility (102) may alternatively be located within the controlled facility (100) or within the third party providers (104).

In at least one implementation of the claimed embodiments, the application server (118) is a computing system with functionality to authenticate an inmate, outsider, administrator, reviewer, or investigator for access to system functionality (e.g., initiating voice or video calls, sending text messages, etc.) or data stored on the database server (120) (e.g., inmate identities, communications between inmates and outsiders, etc.). The application server may authenticate inmates, outsiders, administrators, reviewers, and/or investigators using passwords, biometric data, digital access codes, and/or physical access devices. Further detail about the application server (118) is provided in FIG. 3.

In at least one implementation of the claimed embodiments, the database server (120) is a computing system with functionality to store identities used to authenticate inmates, outsiders, administrators, reviewers, and/or investigators. Such identities may include verified data used to compare to verification data provided by the inmate, outsider, administrator, reviewer, or investigator to authenticate the inmate, outsider, administrator, reviewer, or investigator.

In at least one implementation of the claimed embodiments, the database server (120) also stores communication data about communications between an inmate and an outsider or visitor. Such communication data may include, for example, a recording of a video call, the length of a voice call, the frequency of video calls, sent and received text messages, etc. The database server (120) may also store media submitted to a secure social network before, during, and/or after the media has been reviewed. Further detail about the database server (120) is provided in FIG. 3.

In at least one implementation of the claimed embodiments, the third party providers (104) are computing systems that provide network application and data storage services (i.e., cloud computing services). Third party providers (104) may include service providers used directly by inmates and outsiders, such as photo sharing services, general social networking sites, and digital music retailers. Third party providers (104) may include service providers employed by administrators and for use by inmates and outsiders, such as audio and video streaming applications, conferencing applications, and secure social network media storage. One or more of the components within the third party providers (104) may alternatively be located within the controlled facility (100) or the outside facility (102).

In at least one implementation of the claimed embodiments, the media server (122) is a computing system or group of computing system with functionality to provide network application services to facilitate communication between an inmate and an outsider, and to facilitate access to a secure social network. Such services include, but are not limited to, VoIP services, video conferencing services, and media streaming services.

In at least one implementation of the claimed embodiments, the web server (124) is a computing system or group of computing system with functionality to provide an interface to access and interact with webpages and other network application services. In at least one implementation of the claimed embodiments, the web server (124) is a type of media server (122).

In at least one implementation of the claimed embodiments, the datacenter (126) is a computing system or group of computing system with functionality to provide an interface to access and interact with data stored on one or more data servers (not shown). In at least one implementation of the claimed embodiments, the datacenter (126) is a type of media server (122).

In at least one implementation of the claimed embodiments, the outsider computing device (106) is a computing device with functionality to execute the outsider application (128). In at least one implementation of the claimed embodiments, the outsider computing device (106) is a mobile computing device (e.g., a smartphone, a laptop, a tablet, etc.). Further detail about the outsider computing device (106) is provided in FIG. 6.

In at least one implementation of the claimed embodiments, the outsider application (128) is a process or group of processes (in software, firmware, hardware, or combination thereof) with functionality to enable communication between an outsider and an inmate. Specifically, the outsider application (128) may be used to send or receive text messages and/or initiate or receive voice or video calls. In at least one implementation of the claimed embodiments, the outsider application (128) also enables an outsider to access a secure social network. Specifically, the outsider application (128) may be used to upload media to, or view media from, a secure social network account of the outsider, an inmate, other secure social network member.

Figure 2:
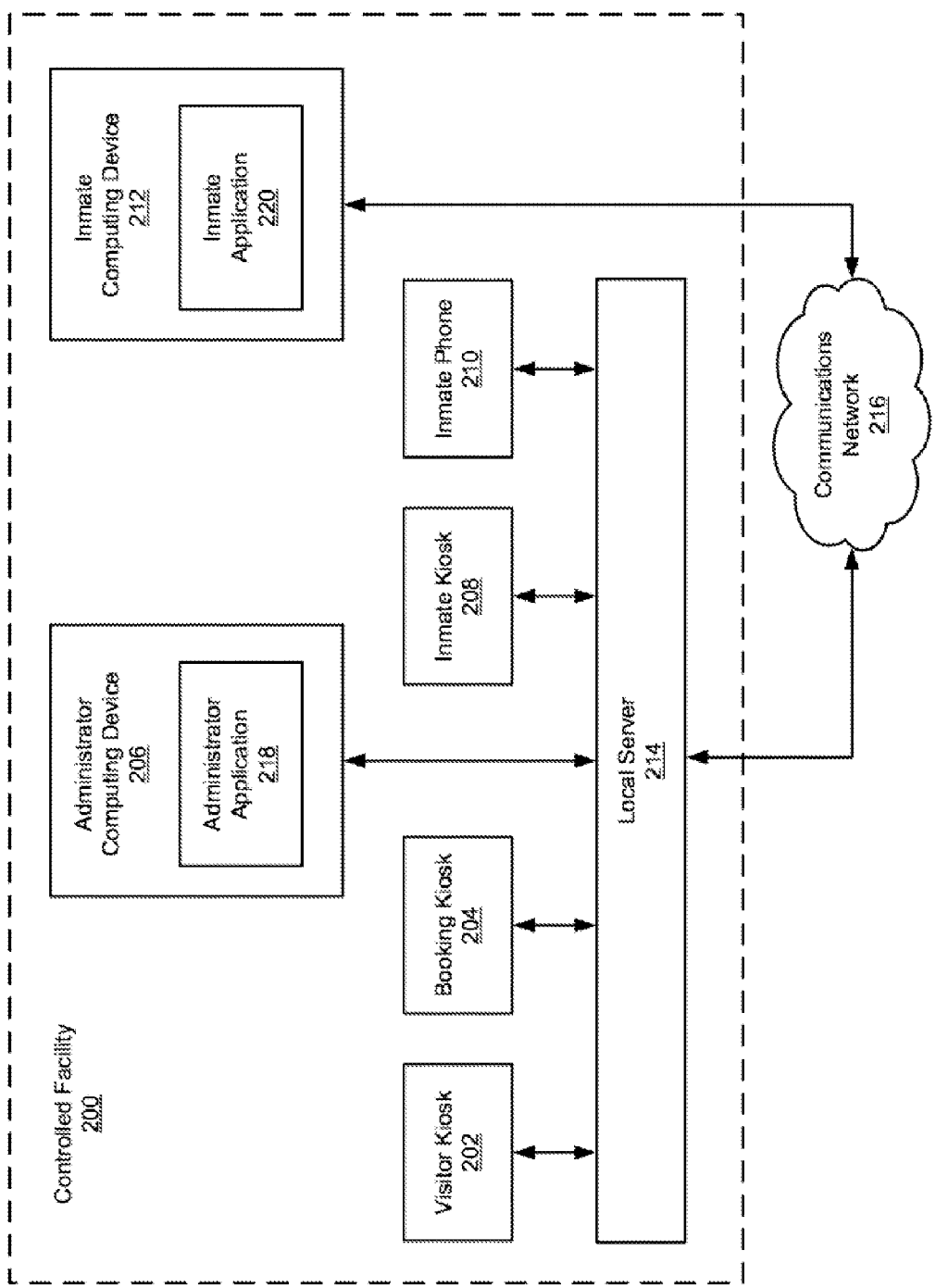

FIG. 2 shows a controlled facility in accordance with at least one implementation of the claimed embodiments. As shown in FIG. 2, the controlled facility (200) may include a visitor kiosk (202), a booking kiosk (204), an administrator computing device (206), an inmate kiosk (208), an inmate phone (210), an inmate computing device (212), and a local server (214). The inmate computing device (212) and the local server (214) are communicatively coupled to the communications network (216). The administrator computing device (206) includes an administrator application (218). The inmate computing device (212) includes an inmate application (220).

In at least one implementation of the claimed embodiments, the visitor kiosk (202) is a computing system with functionality to facilitate communication between an inmate and a visitor. Specifically, the visitor kiosk (202) may be a combination of computing hardware and software used by a visitor to make and receive voice and video calls to/from an inmate residing in the same controlled facility (200) or another controlled facility (not shown). The visitor kiosk (202) may also be used to schedule a voice or video call with an inmate for a future date. Further, the visitor kiosk (202) may also include the functionality to exchange media (e.g., photos, videos, and audio) with an inmate residing in the controlled facility (200). The visitor kiosk (202) may include functionality to generate such media, such as a camera, microphone, keyboard, and software to record or otherwise create media to send to an inmate. Such media may be subject to review before being delivered.

In at least one implementation of the claimed embodiments, a visitor wanting to use a visitor kiosk (202) may be required to participate in an authentication process to verify the identity of the visitor. The authentication process may include creating an identity data item and verified data for storage and later comparison. The verified data used for authentication may be a username and password combination and/or biometric information about the visitor.

In at least one implementation of the claimed embodiments, the visitor kiosk (202) includes functionality to access a secure social network. Specifically, the visitor kiosk (202) may be used by a visitor to create and manage a secure social network account. The visitor kiosk (202) may also be used by a visitor to upload digital media to the visitor's secure social network account or the account of another secure social network member. The visitor kiosk (202) may further be used to view digital media uploaded to the visitor's social network account or the account of another secure social network member.

In at least one implementation of the claimed embodiments, the visitor kiosk (202) includes functionality to manage a commissary account for one or more inmates. Specifically, a visitor may use a visitor kiosk (202) to add money to the commissary account of an inmate in the controlled facility (200), view a transaction history of the commissary account, transfer funds between commissary accounts, and/or remove funds from a commissary account. Further detail about the visitor kiosk (202) is provided in FIG. 5A and FIG. 5B.

In at least one implementation of the claimed embodiments, the booking kiosk (204) is a computing system with functionality to aid administrators in admitting an inmate into a controlled facility (e.g., controlled facility (200)). Specifically, the booking kiosk (204) may include functionality to create or update an inmate identity data item. Specifically, the booking kiosk (204) may be used to obtain verified data (e.g., passwords, biometric data, etc.) and save the verification data in one or more identity data items for the inmate. The verified data may then be used to authenticate the inmate (e.g., to access the communications network (216), etc.). In at least one implementation of the claimed embodiments, the booking kiosk may also be used to associate one or more restrictions with the inmate via the inmate's identity data item.

In at least one implementation of the claimed embodiments, the booking kiosk (204) includes functionality to input contact information for visitors, outsiders, administrators, or other inmates with whom the inmate wants to communicate. Such contact information may then be associated with the inmate's identity data item, and may be used to initiate a voice or video call, or otherwise transmit media to visitors, outsiders, or other inmates. Further, in at least one implementation of the claimed embodiments, the contact information may be retrieved from an inmate's mobile computing device (e.g., cell phone, smart phone, etc.) or a local or remote data storage device (e.g., a flash drive, a webmail account, etc.). The contact information may be retrieved using a wired or wireless connection between the booking kiosk and the inmate's mobile computing device and/or the data storage device. The contact information may be subject to review before the inmate is permitted to contact the visitor, outsider, administrator, or other inmate.

In at least one implementation of the claimed embodiments, the booking kiosk (204) includes functionality to prepare a mobile computing device for use by the inmate within the controlled facility (200). Specifically, a controlled facility (200) may allow inmates the use of computing devices while in or subject to the controlled facility (200). However, use of such inmate computing devices may require that the computing device is instrumented with software restricting the use of the inmate computing device. The booking kiosk (204) may be used to instrument the inmate computing device as required. Further detail about the booking kiosk (204) is provided in FIG. 5A and FIG. 5B.

In at least one implementation of the claimed embodiments, the administrator computing device (206) is a computing system or group of computing systems with functionality to execute the administrator application (218). In at least one implementation of the claimed embodiments, the administrator application (218) is a process or group of process with functionality to provide access to communications between inmates at the controlled facility (200) and visitors, outsiders, administrator, and other inmates. The administrator application (218) may also be used to monitor current voice or video calls between an inmate and a visitor, outsider, administrator, or other inmate.

In at least one implementation of the claimed embodiments, the administrator application (218) is used to manage an identity data item associated with an inmate. Such management may include altering the restrictions (device use restrictions, inmate use restrictions, and inmate target restrictions) applicable to the inmate. In at least one implementation of the claimed embodiments, the administrator application (218) is used to access the secure social network account of an inmate, visitor, or outsider. In at least one implementation of the claimed embodiments, the administrator application (218) may provide heightened access (i.e., a level of access greater than that of the inmate, visitor, or outsider) to data stored in the secure social networking account.

In at least one implementation of the claimed embodiments, the inmate kiosk (208) is a computing system with functionality to facilitate communication between an inmate and a visitor or outsider. Specifically, the inmate kiosk (208) may be a combination of computing hardware and software used by an inmate to make and receive voice and video calls to/from a visitor, outsider, or another inmate residing in another controlled facility (not shown). The inmate kiosk (208) may also be used to schedule a voice or video call with a visitor at a future date. Initiating or scheduling a voice or video call may include determining whether the currently attempted call or the scheduled call are adverse to one or more restrictions (e.g., inmate use restrictions, device use restrictions, and/or inmate target restrictions). Further, the inmate kiosk (208) may also include the functionality to exchange media (e.g., photos, videos, and audio) with a visitor or outsider. The inmate kiosk (208) may include functionality to generate such media, such as a camera, microphone, keyboard, and software to record or otherwise create media to send to a visitor or outsider. Such media may be subject to review before being delivered.

In at least one implementation of the claimed embodiments, an inmate wanting to use an inmate kiosk (208) may be required to participate in an authentication process to verify the identity of the inmate. The authentication process may include providing verification data for comparison to verified data previously obtained from the inmate and stored in the inmate identity data item. The verified data may be a username and password combination and/or biometric information about the inmate.

In at least one implementation of the claimed embodiments, the inmate kiosk (208) includes functionality to access a secure social network. Specifically, the inmate kiosk (208) may be used by an inmate to manage a secure social network account. The inmate kiosk (208) may include functionality to generate such media, such as a camera, microphone, keyboard, and software to record or otherwise create media to send to a visitor or outsider. The inmate kiosk (208) may also be used by an inmate to upload digital media to the inmate's secure social network account or the account of another secure social network member. The inmate kiosk (208) may further be used to view digital media uploaded to the inmate's social network account or the account of another secure social network member. Uploaded media may be subject to review before posting.

In at least one implementation of the claimed embodiments, the inmate kiosk (208) includes functionality to manage a commissary account for the inmate. Specifically, an inmate may use an inmate kiosk (208) to view a transaction history of the commissary account and/or to apply commissary funds for goods and services consumed or enjoyed by the inmate. Further detail about the inmate kiosk (208) is provided in FIG. 5A and FIG. 5B.

In at least one implementation of the claimed embodiments, the inmate phone (210) is a device with functionality to send and receive audio communications between an inmate and an outsider or visitor. The inmate phone (210) may be implemented as handset connected to a telephone line. In at least one implementation of the claimed embodiments, all or part of the voice call may be conducted over a VoIP connection. In at least one implementation of the claimed embodiments, a single inmate phone (210) is utilized by multiple inmates.

In at least one implementation of the claimed embodiments, initiating or receiving a voice call using the inmate phone (210) requires a form of authentication (e.g., providing a password, personal identification number, or voice verification). In at least one implementation of the claimed embodiments, voice calls made using the inmate phone (210) are monitored by one or more administrators using the administrator computing device (206), and are recorded and stored in a data storage system within the controlled facility (200), within the outside facility (not shown), or within a third party provider (not shown). The inmate phone (210) may also be subject to device use restrictions limiting the ability to use the inmate phone (210) at certain times (e.g., between 9 PM and 8 AM) or under certain conditions (e.g., emergency lockdown).

In at least one implementation of the claimed embodiments, the identity of the visitor or outsider targeted by the inmate or attempting to contact the inmate using the inmate phone (210) is verified against inmate target restrictions imposed on the inmate. Such restrictions may be associated with the inmate's identity data item and may be stored locally within the controlled facility (200), within the outside facility (not shown), or within a third party provider (not shown). The visitor or outsider identity may be verified by the local server (214) or by another server within the outside facility (not shown), or within a third party provider (not shown).

In at least one implementation of the claimed embodiments, the inmate computing device (212) is a computing system configured to execute the inmate application (202). In at least one implementation of the claimed embodiments, each inmate computing device (212) is utilized exclusively by a single inmate. In at least one implementation of the claimed embodiments, access to the inmate application requires a form of initial authentication. This initial authentication may use verification data stored locally on the inmate computing device (212) (e.g., a code or combination used to unlock the phone, locally stored biometric data, etc.).

In at least one implementation of the claimed embodiments, accessing a communications network (e.g., communications network (216)) using the inmate application (220) may require further network-based authentication. This further authentication may use verification data stored external to the inmate computing device (212) but locally within the controlled facility (200), or remotely within the outside facility (not shown) or within a third party provider (not shown).

In at least one implementation of the claimed embodiments, an authenticated inmate may use the inmate application to initiate or receive voice or video calls, initiate or receive text or media messages, schedule a voice or video call, manage a commissary account, or post media to a secure social network. In at least one implementation of the claimed embodiments, voice and video calls made using the inmate computing device (212) are monitored by one or more administrators using the administrator computing device (206), and are recorded and stored in a data storage system within the controlled facility (200), within the outside facility (not shown), or within a third party provider (not shown).

In at least one implementation of the claimed embodiments, the identity of the visitor or outsider targeted by the inmate or attempting to contact the inmate using the inmate computing device (212) is verified against inmate target restrictions imposed on the inmate. Such restrictions may be associated with the inmate's identity data item and may be stored locally within the controlled facility (200), within the outside facility (not shown), or within a third party provider (not shown). The visitor or outsider identity may be verified by the local server (214) or by another server within the outside facility (not shown), or within a third party provider (not shown).

In at least one implementation of the claimed embodiments, the inmate computing system (212) and/or the inmate application (220) may limit access to the communications network (216) based on one or more restrictions (inmate use restrictions, inmate target restrictions, and device use restrictions). Further, the inmate computing system (212) and/or the inmate application (220) may gather data from input devices of the inmate computing system (212) to determine whether one or more restrictions apply. Such input devices may include, for example, a system clock, a global positioning system antenna, a wide area network antenna, etc.

In at least one implementation of the claimed embodiments, the local server (214) is a computer system or group of computers systems located within the controlled facility (200) that facility communication between inmates and visitors, outsiders, and/or other inmates. Specifically, the local server (214) may implement the software necessary to host voice and video calls between and among the visitor kiosk (202), the inmate kiosk (208), the inmate phone (210), and an outsider computing system (not shown). The local server (214) may also include functionality to enforce communication restrictions associated with the inmates using the inmate kiosk (208) or inmate phone (210). Alternatively, the local server (214) may merely provide access to other systems capable of hosting the communication software and data storage (e.g., located within an offsite facility or a third party provider). Further, in at least one implementation of the claimed embodiments, the local server (214) includes functionality to regulate inmate access to a secure social network.

Figure 3:
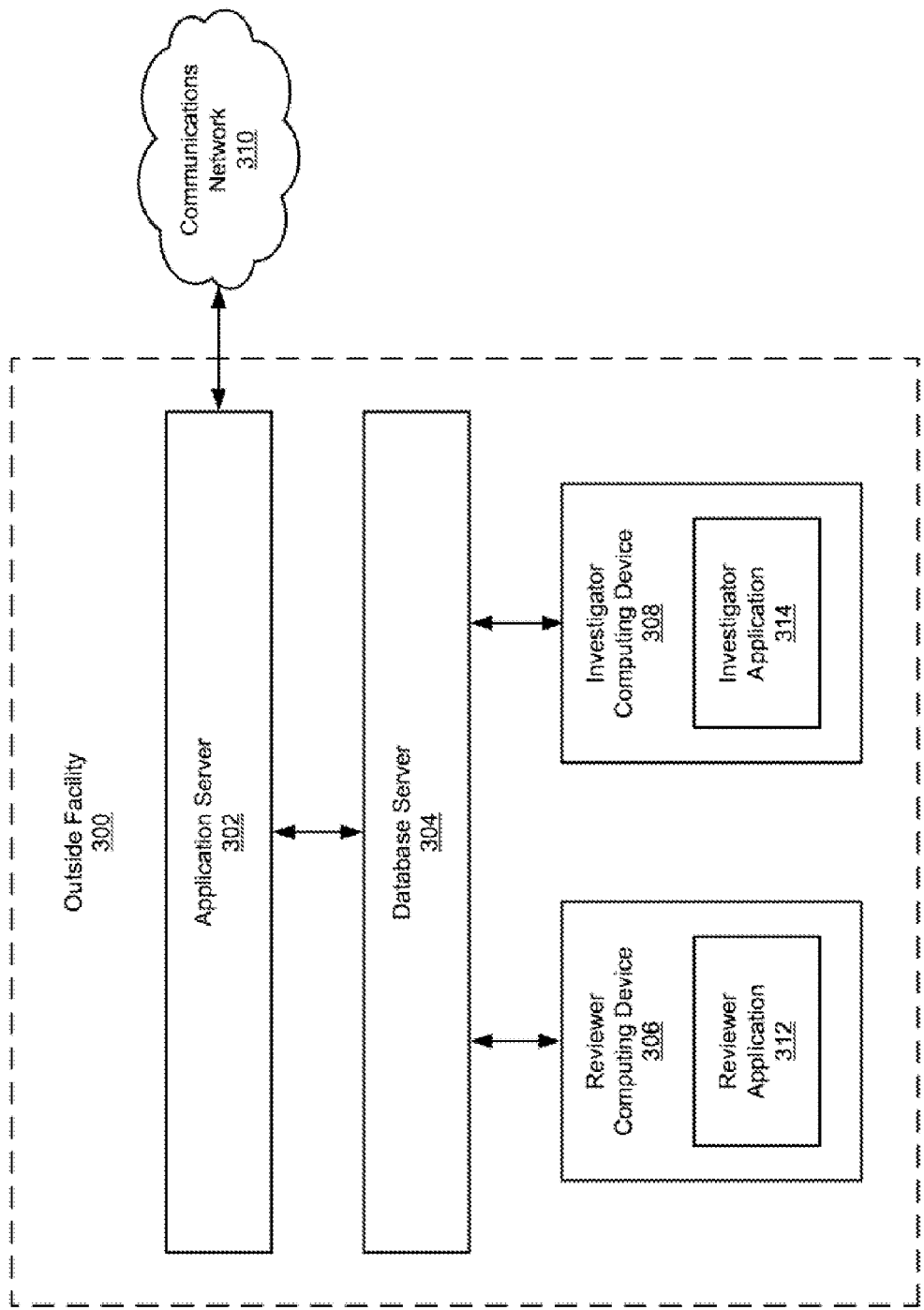

FIG. 3 shows an outside facility in accordance with at least one implementation of the claimed embodiments. As shown in FIG. 3, the outside facility (300) may include an application server (302), a database server (304), a reviewer computing system (306), and an investigator computing system (308). The application server (302) is communicatively coupled to the communications network (310). The reviewer computing device (306) may include a reviewer application (312), and the investigator computing device (308) may include an investigator application (314).

In at least one implementation of the claimed embodiments, the application server (302) is a computing system or group of computing systems configured to authenticate inmates, visitors, outsiders, administrators, reviewers, and/or investigators. Specifically, the application server (302) includes functionality to receive a request to authenticate an inmate, visitor, outsider, administrator, reviewer, and/or an investigator, retrieve verified data associated with the request, and compare the verified data to verification data submitted in the authentication request. In at least one implementation of the claimed embodiments, the application server provides access to identity data items and other data stored in the database server (304).

In at least one implementation of the claimed embodiments, the database server (304) is a computing system or group of computing system configured to store data about inmates, visitors, outsiders, administrators, reviewers, and/or investigators as well as communication data describing communications between and among inmates, visitors, outsiders, administrators, reviewers, and/or investigators. Data stored in the database server may include, but is not limited to, identity data items, verified data, approved communication media, communication media pending review In at least one implementation of the claimed embodiments, the reviewer computing device (306) is a computing system configured to execute the reviewer application (312). In at least one implementation of the claimed embodiments, a reviewer is a person charged with viewing a media item submitted by an inmate, visitor, outsider or administrator, and determining one or more attributes of the media item. Based on the determined attributes of the media item, the reviewer may then approve the media item for transmission to its target inmate, visitor, or outsider. Alternatively, the reviewer may reject the media item, conditionally approve the media item, or redact parts of the media item, thus preventing complete transmission to its target inmate, visitor, or outsider. In at least one implementation of the claimed embodiments, the reviewer application (312) include functionality to view media items, associate one or more attributes to the media item, and/or mark the media items as approved or rejected.

In at least one implementation of the claimed embodiments, the investigator computing device (308) is a computing system configured to execute the investigator application (314). In at least one implementation of the claimed embodiments, an investigator is a person gathering information about an inmate, visitor, or outsider generally for the purposes of law enforcement. The investigator application (314) includes functionality to provide access to data stored on the database server (304) for investigative purposes.

Figure 4:
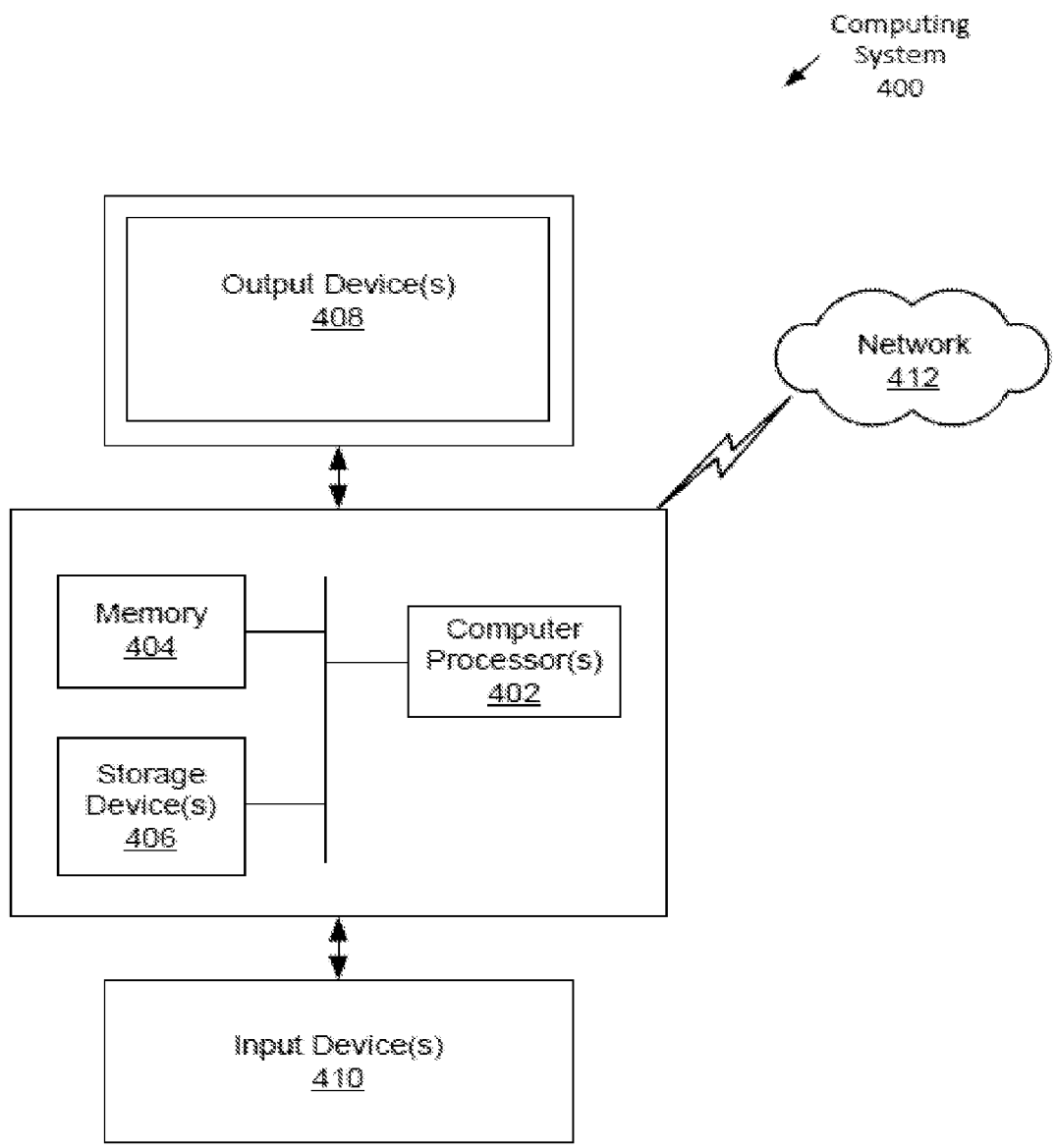

FIG. 4 shows a general computing system in accordance with at least one implementation of the claimed embodiments. As shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or microcores of a processor. The computing system (400) may also include one or more input device(s) (410), such as a touchscreen, keyboard, mouse, microphone, touchpad, electronic pen, camera, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (400) may be connected to a network (414) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (414). Further, embodiments of the invention may be implemented on a distributed system having a plurality of nodes, where each portion of the invention may be located on a different node within the distributed system. In at least one implementation of the claimed embodiments, the node corresponds to a distinct computing device. Alternatively, the node may correspond to a computer processor with associated physical memory. The node may alternatively correspond to a computer processor or micro-core of a computer processor with shared memory and/or resources.

Figure 5A:
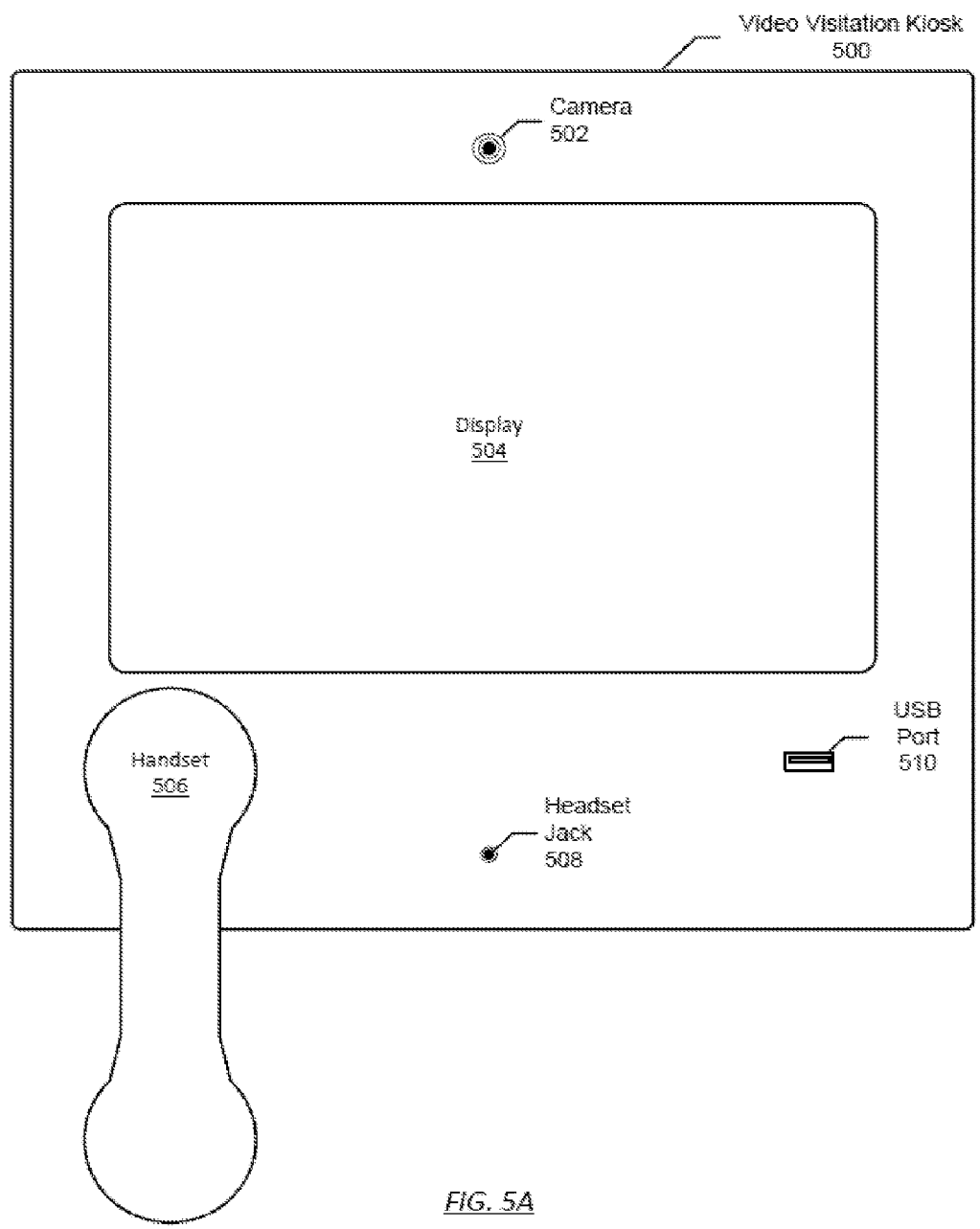

FIG. 5A shows a video visitation kiosk in accordance with at least one implementation of the claimed embodiments. Specifically, the video visitation kiosk (500) is a type of computing device as described in FIG. 4. As shown in FIG. 5A, the video visitation kiosk (500) includes a camera (502), a display (504), a handset (506), a headset jack (508), and a universal serial bus (USB) port (510).

Figure 5B:
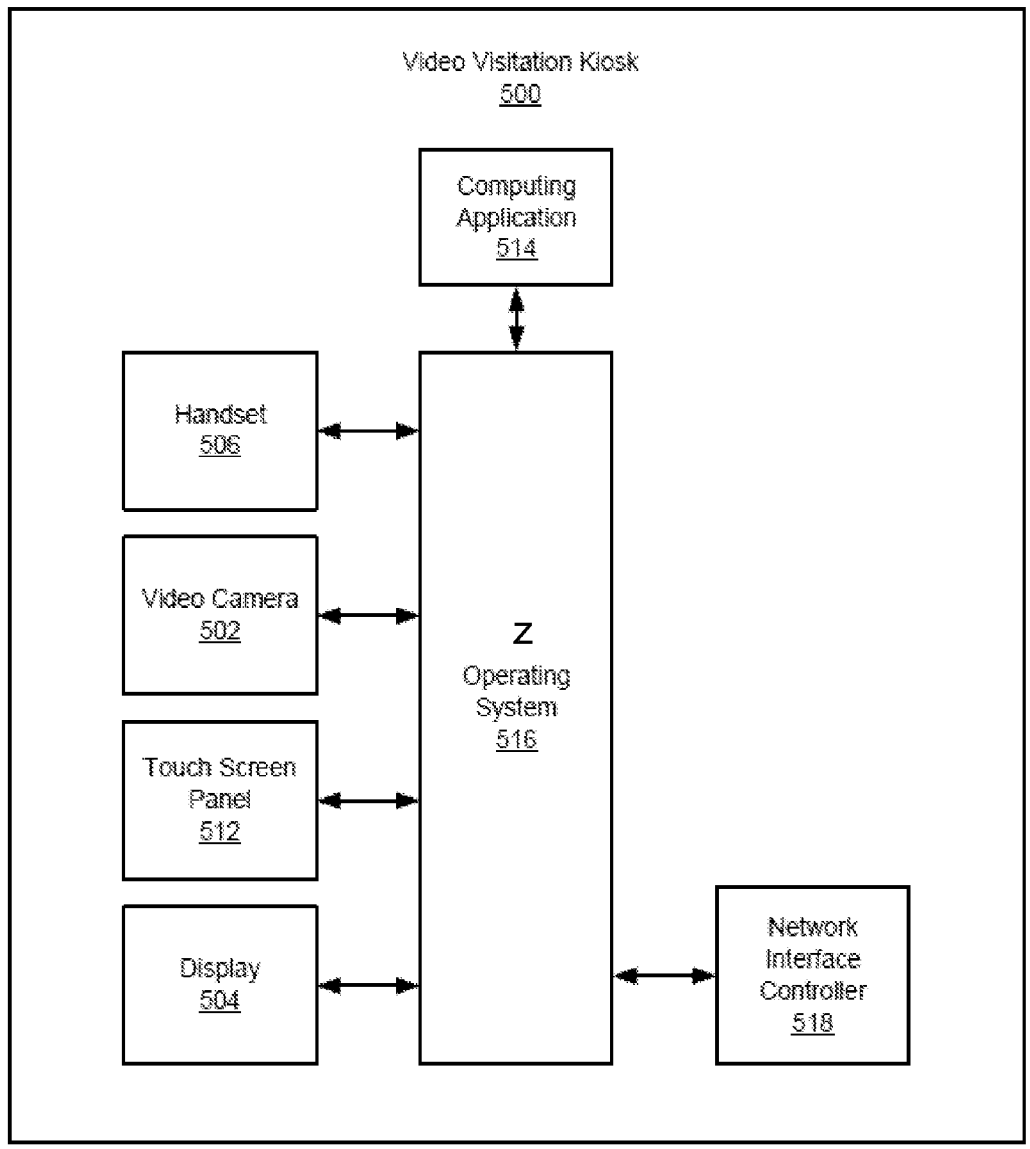

FIG. 5B shows the hardware and software elements of a video visitation kiosk in accordance with at least one implementation of the claimed embodiments. The hardware and software elements shown in FIG. 5B may be in addition to the elements described in FIG. 4. As shown in FIG. 5B, the video visitation kiosk (500) includes a handset (506), a video camera (502), a touch screen panel (512), a display (504), a computing application (514), an operating system (516), and a network interface controller (518).

Figure 6:
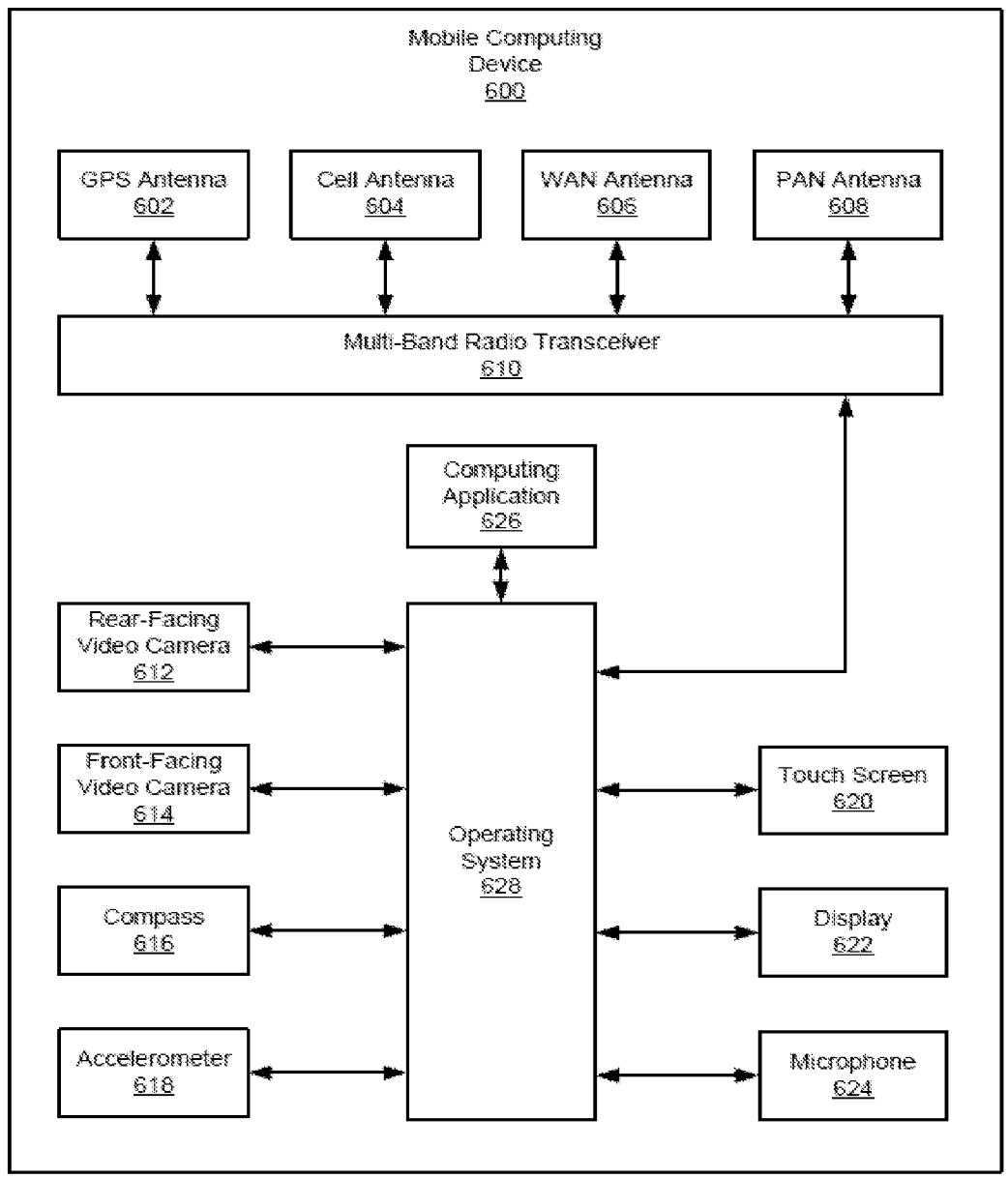

FIG. 6 shows the hardware and software elements of a mobile computing device in accordance with at least one implementation of the claimed embodiments. Specifically, the mobile computing device (600) is a type of computing device as described in FIG. 4. The hardware and software elements shown in FIG. 6 may be in addition to the elements described in FIG. 4.

As shown in FIG. 6, the mobile computing device (600) may include a global positioning system (GPS) antenna (602), a cell antenna (604), a wide area network (WAN) antenna (606), and a personal area network (PAN) antenna (608), each connected to a multi-band radio transceiver (610). The mobile computing device (600) also may include a rear-facing video camera (612), a front-facing video camera (614), a compass (616), an accelerometer (618), a touch screen (620), a display (622), and a microphone (624). The mobile computing device (600) also may include a computing application (626) executing on an operating system (628).

This disclosure also relates to methods and systems used in a detention environment for verifying an individual's identity utilizing a centralized database operable across disparate types of interactions. Current methods and systems for identity verification in detention environments are non-uniform for disparate types of interactions and the methods and systems are not easily compatible with one another. Therefore, it is difficult to track interactions of an individual and an individual subject to the detention environment. The disclosed method and system verify all individuals contacting, interacting with or otherwise connecting to an individual subject to the detention environment. In contrast, those individuals subject to the detention environment, such as inmates, patients, or detainees, may be verified using existing methods and systems since it is possible to obtain a wide range of information from the individual when they are in the detention environment. For example, when a prisoner is processed through a jail, it is common for the jail to obtain the prisoner's identity information such e.g., as fingerprints, DNA samples, and voice samples.

Figure 7:
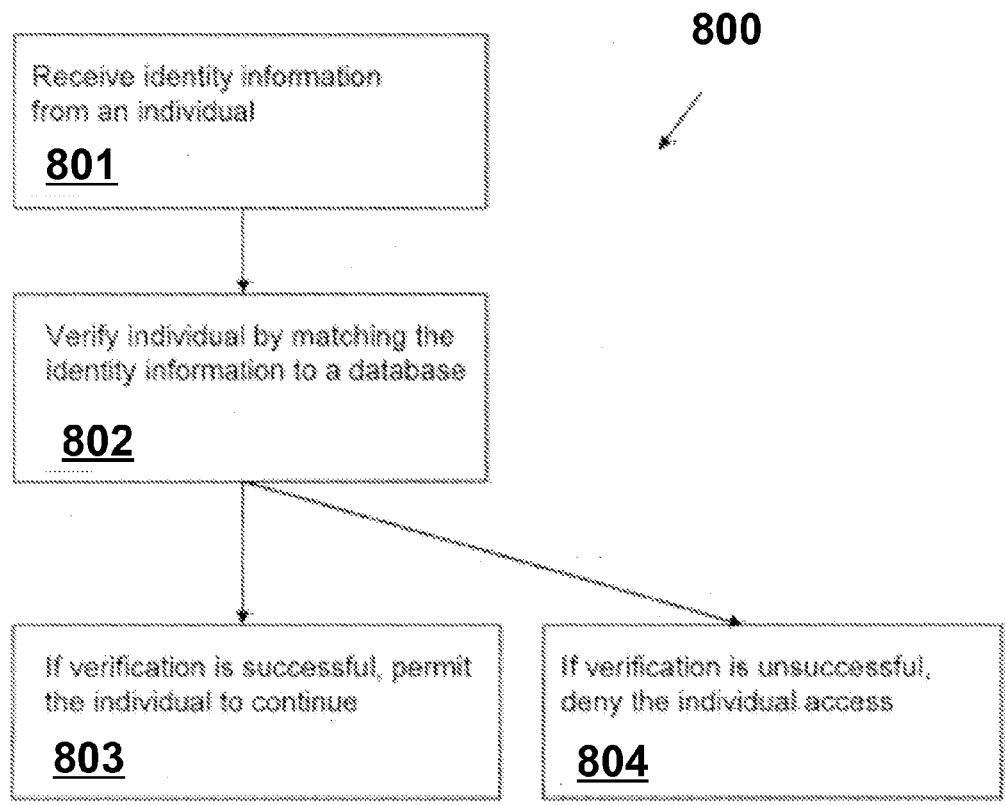
FIGS. 7-10 are schematic diagrams that illustrate methods and system for identity verification in a detention environment.

FIG. 7 is a diagram illustrating one embodiment of a method 800 according to aspects of the present disclosure. The method 800 is designed for use within a detention environment or as part of a method monitoring a detention environment. This method 800 applies to anyone who attempts to interact with an individual subject to a detention environment, for example, by visiting or making a transaction on behalf of the individual subject to the detention environment. As used herein, the term "individual" is used to refer to a person attempting to interact with, or on behalf of, a person subject to the detention environment who will be referred to herein as the "individual subject to the detention environment." The method 800 receives the individual's identity information at step 801 by way of a programmable device or system, such as e.g., a computer, a call screening system, a detention environment guard, or an interactive audio/video system and device for use in a detention environment disclosed in U.S. patent application Ser. No. 13/088,883, which is incorporated by reference herein. It should be appreciated that where a definition or use of a term in an incorporated application or reference is inconsistent with or contrary to the definition of that term provided herein, the definition of that term provided herein applies. The individual could be prompted to input identity information, such as, the zip code of their residence, mother's maiden name, a number of digits of the applicant's social security number, or other questions that lead to a unique individual. Identity information may also be contained in an identification card, which is processed by the programmed device or system, and may assist with the verification process. As just one example, an individual may scan their driver's license, and the programmed device or system may read the license, and fill out form fields such as name, address, and gender based on information on the license. This process may be implemented by use of a magnetic strip, a two-dimensional or three-dimensional bar code, or optical character recognition. Identity information may also be biometric information, such as, facial recognition, body recognition, voice recognition, retinal scan, fingerprint, DNA sample, or palm print. Identity information may also come from an interaction with the individual's phone, such as, swiping a phone through a scanner, keying in a unique phrase or number that was sent to a phone, or answering a call made to the individual's phone.

The method 800 is also designed to verify an individual's identity by matching the individual's identity information with information in a database (at step 802). The database is populated with identity information from a data source or a plurality of data sources. In some cases the identity information from the data source existed prior to the individual's interaction with the individual subject to the detention environment. These data sources may include: line information databases to find phone number and address associations; best known name and address databases to associate names with addresses; identification verification databases to match a provided name with digits of a social security number or other unique participant-assigned number; national financial information databases for existing financial records; national passport database; other government issued identification database such as a drivers' license database, a military identification database, or state issued identification card database; open warrants database; a national victim notification network such as VINE or VINELink; or a "do not contact" database. The database may also be populated by the data sources upon command, at intervals, or dynamically.

The method 800 is also desirably compatible with a data source such as the consolidated voicemail platform disclosed in U.S. patent application Ser. No. 12/826,168, which is incorporated by reference herein, and an information exchange facilitating system such as e.g., the secure social network disclosed in U.S. patent application Ser. No. 13/438,940, which is also incorporated by reference herein.

In some circumstances, an investigator will review attempted interactions with individuals subject to the detention environment. As just one example, an individual will attempt to interact by depositing money in the commissary account of an individual subject to the detention environment. The method 800 will check the database, and ask the individual enough questions until the method 800 is able to positively match the individual's identity information with information in the database. A consequence of this method 800 is that individuals will be verified upon each attempted interaction. For example, there may be several variations of J. Jones, J. D. Jones, Jonathan Jones, and John Jones appearing in a criminal investigation that involves attempted interactions with an individual subject to a detention environment. The identification of a J. Jones in a metropolitan area may require an extraordinary effort. Since the disclosed method 800 requires verification of an individual before he/she is allowed to interact with an individual subject to the detention environment, the disclosed method 800 may pinpoint the identity to a distinct individual named Jonathan D. Jones.

In an additional embodiment, the step of receiving identity information may also include receiving additional information from the individual after the individual is verified, such as e.g., a photograph or digital image of the individual, a scan of the individual's identification card, and additional information from additional questions. After the individual is verified, the individual may also establish a username and password, or a unique personal identification phrase, number, or series of characters. This establishment of a username and password would facilitate an additional identification process during future attempted interactions.

In another embodiment, the disclosed method supplements a verified identity with additional information from the database such as e.g., a date of birth, an address, and/or a photograph. In yet another embodiment, information, such as a phone number, associated with the individual is found to be associated with previous phone calls made by the individual subject to the detention environment. In this case, the disclosed method may associate those previous phone calls with the verified identity information, allowing the method to retroactively link a person in a detention environment to a specific verified person through a phone number. Similar associations could be made through credit card data, address data, and more.

In another embodiment, when an individual had been previously verified, the method 800 may receive a previously verified individual's username and password as the identity information during the verification process (i.e., step 801). The method 800 may also receive a previously verified individual's physical attributes as the identity information during the verification process. The physical attributes may include a voiceprint comparison, facial or body recognition, DNA sample, retinal scan, or other form of biometric attribute. The method 800 may also receive a previously verified individual's identification credential as the identity information during the verification process; this may include a passport, drivers license, military identification, or similar. The method 800 may also receive during the verification process a previously verified individual's mobile phone interaction as the identity information, which may involve responding to a phone call or text message, or requiring the previously verified individual to call or text message to a specific phone number. In the absence of all other means of identification, or as a means to expedite the process, the method 800 may receive a detention environment staff member's authorization to authenticate a verified individual by sight, or through spoken or direct questions.

After step 802 is complete, the method 800 will either verify or not verify an individual's identity. The method 800 will either permit the individual to continue if the individual is verified at step 803, or deny the individual access if the individual is not verified at step 804. If the individual is not permitted to continue, then the method may proceed to the additional steps shown in FIG. 8. If the individual is permitted to continue, then the method may proceed to the additional steps shown in FIG. 9.

Figure 8:
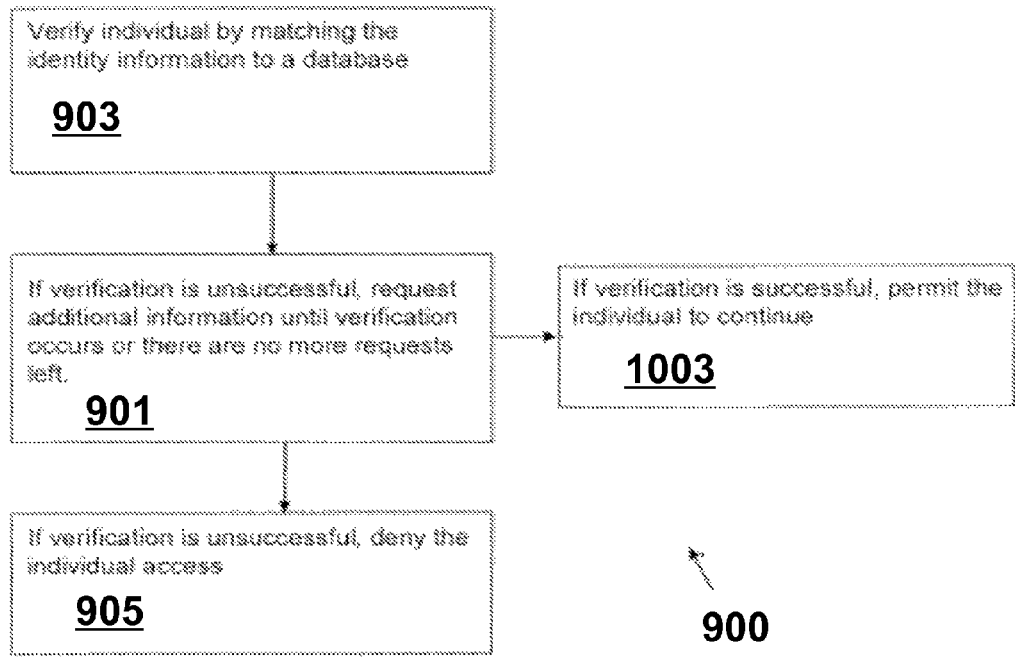

FIG. 8 illustrates an additional method designed for use when method 800 receives an individual's identity information, but fails to verify the individual. In that circumstance, method 900 will request additional identity information from the individual until a match is found or there are no more requests left to issue (step 901). The method 900 may request as many types of identity information from an individual as there are in the database. If verification is successful, the method 900 permits the individual to interact with the detention environment at step 903. If the verification is still unsuccessful, then the method 900 denies the individual interaction with the individual subject to the detention environment (step 804).

Figure 9:
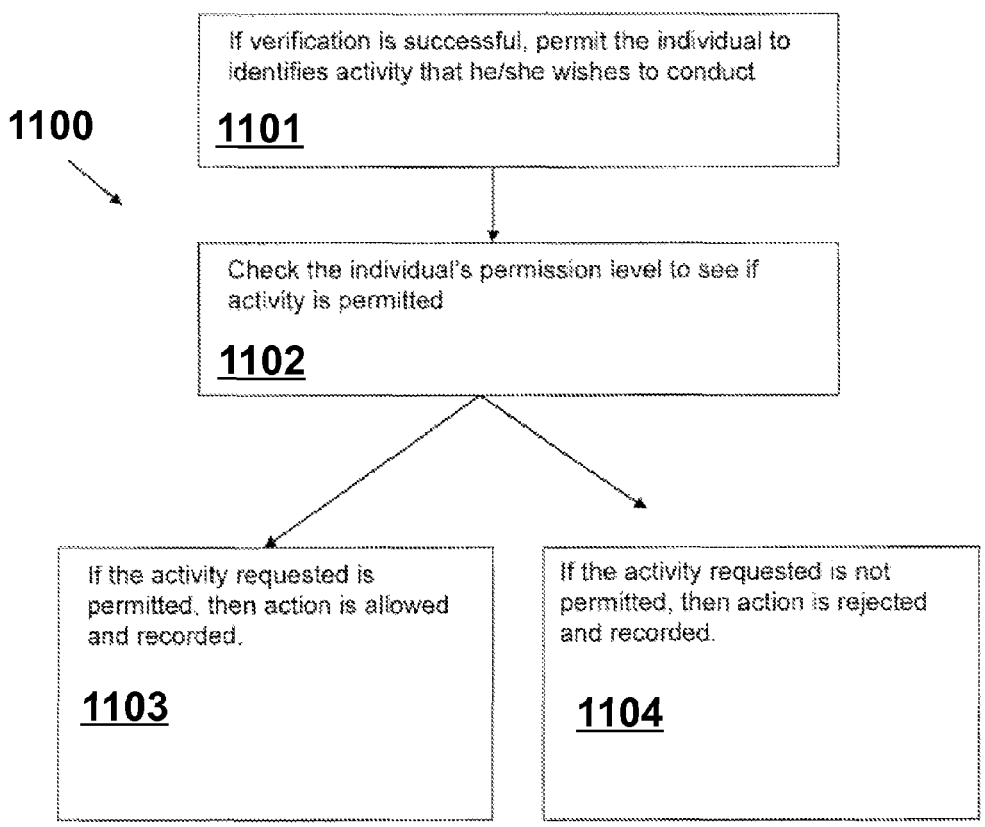

FIG. 9 illustrates an additional method 1100 designed to check an individual's permission level to determine whether a requested interaction is allowed. Once verification is successful (step 1003), the method 1100 permits the individual to request a particular interaction to conduct at step 1101 (e.g., placing a telephone call). The method 1100 then checks the verified individual's permission level to see if the requested activity is permitted (step 1102). If the interaction requested is permitted, the method 1100 permits the interaction and records the interaction at step 1103. If the activity requested is not permitted, then the interaction is rejected and the attempt is recorded at step 1104.

Figure 10:
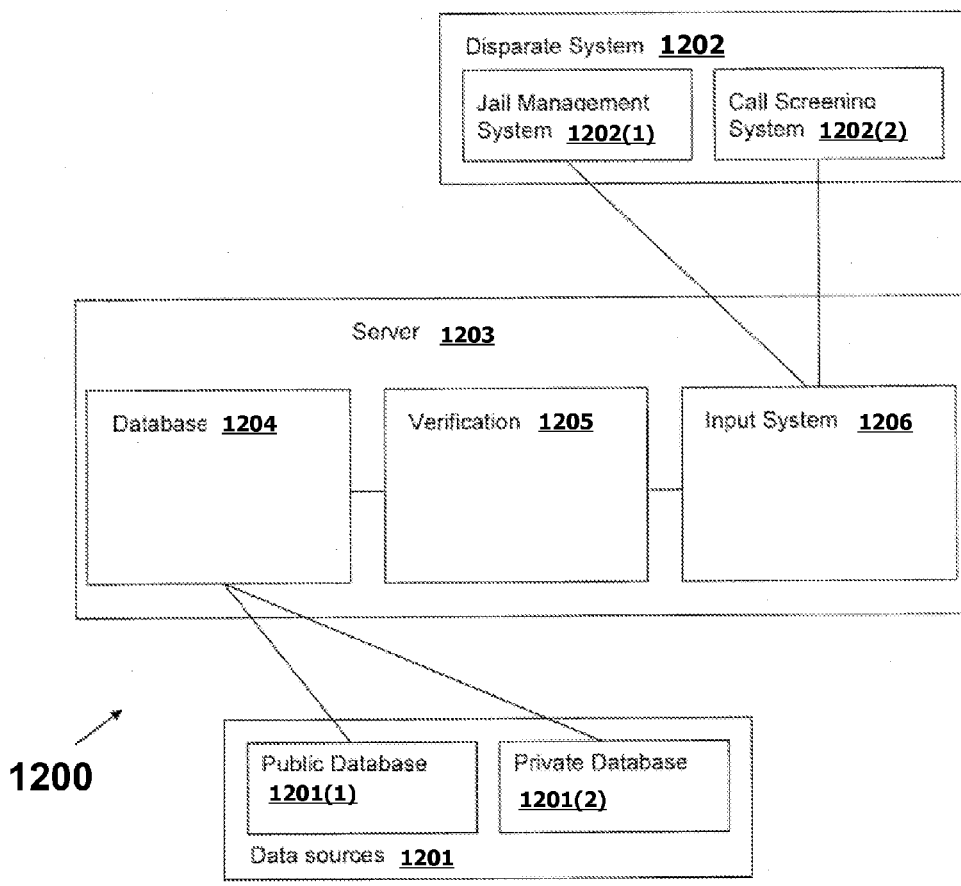

FIG. 10 is a diagram illustrating one embodiment of a system 1200 according to aspects of the present disclosure. The system 1200 includes a server 1203 comprising a database 1204, a verification system 1205, and an input system 1206. The server 1203 is programmed to perform one, all, or a combination of the methods 800, 900, 1100 disclosed herein. The database 1204 is populated with identity information from various data sources 1201, such as, a public database 1201(1) or a private database 1201(2). Public databases 1201(1) may include a line information database, best known name and address database, social security database, national financial information database, national passport database, government issued identification database, warrants database, national victim network database, or "do not contact" database. Private databases 1201(2) may include databases aggregated by the detention environment itself. In some cases the identity information from the data source 1201 existed prior to the individual's interaction with the individual subject to the detention environment. The database 1204 may also be populated by the data sources upon command, at intervals, or dynamically.

The system 1200 is preferably compatible with data sources 1201, such as e.g., the interactive audio/video system and device for use in a detention environment disclosed in U.S. patent application Ser. No. 13/088,883, the consolidated voicemail platform disclosed in U.S. patent application Ser. No. 12/826,168, an information exchange facilitating system such as e.g., the secure social network disclosed in U.S. patent application Ser. No. 13/438,940.

When an individual inputs information through one of the disparate systems 1202 for managing detention environment interactions, such as a jail management system 1202(1) or call screening system 1202(2), the server 1203 receives that information through its input system 1206. The verification system 1205 takes the information obtained through the input system 1206 and verifies the identifying information by matching it with the information stored in the database 1204.

In accordance with the practices of persons skilled in the art of computer programming, embodiments of the method 800, 900, 1100 are described with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits. Embodiments may also encompass integrated circuitry including circuit elements capable of performing specific system operations.

When implemented in a programmed device or system, the elements of the embodiments are essentially the code segments to perform the necessary tasks. The non-transitory code segments may be stored in a processor readable medium or computer readable medium, which may include any medium that may store or transfer information. Examples of such media include an electronic circuit, a semiconductor memory device, a read-only memory (ROM), a flash memory or other non-volatile memory, a floppy diskette, a CD-ROM, an optical disk, a hard disk, a fiber optic medium, etc. User input may include any combination of a keyboard, mouse, touch screen, voice command input, etc. User input may similarly be used to direct a browser application executing on a user's computing device to one or more network resources, such as web pages, from which computing resources may be accessed.

Figure 11:
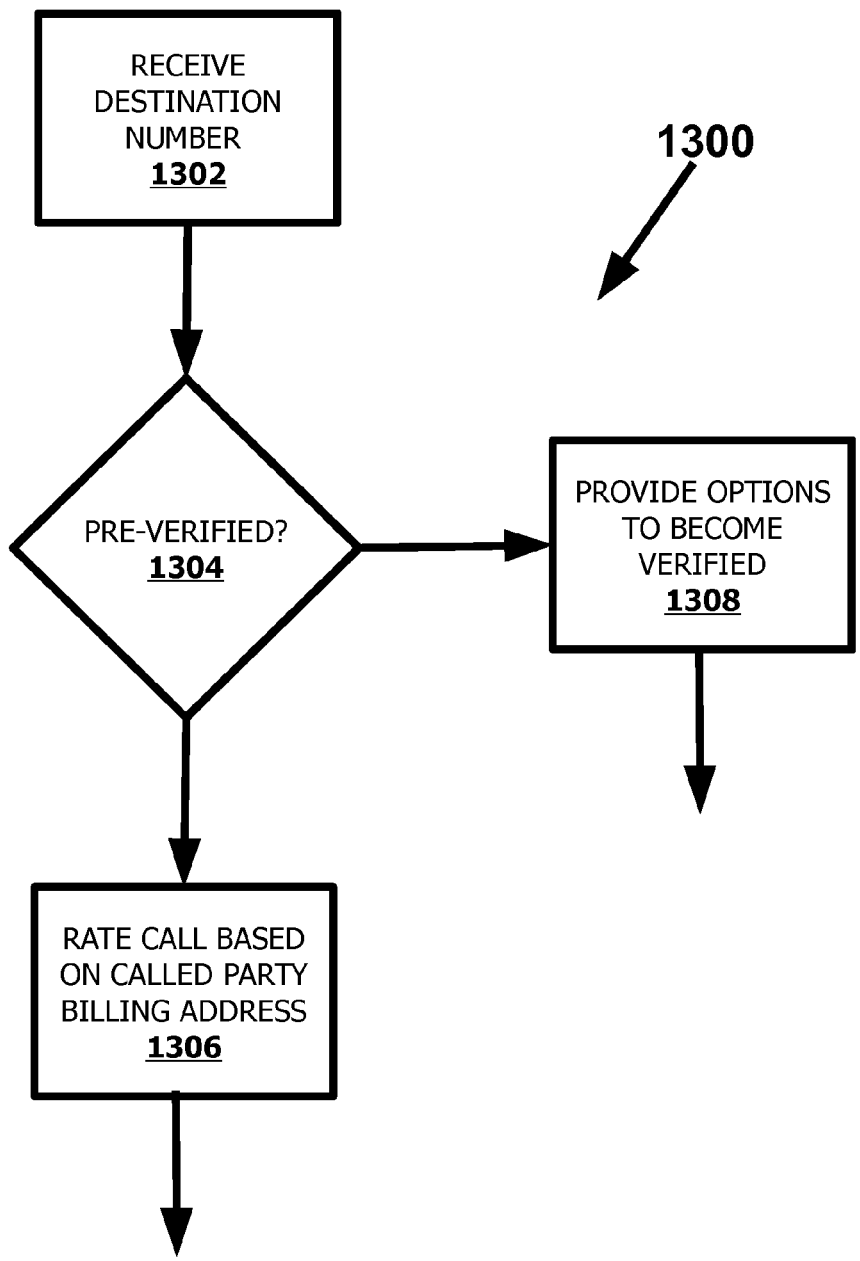
FIGS. 11-12 are flowchart diagrams that illustrate residence-based call rating methods, in accordance with the claimed embodiments.

Now that various operational environments and related systems have been described, in which the claimed embodiments may be practiced upon or in conjunction, examples of those claimed embodiments will now be presented. Specifically, FIG. 11 is a flowchart diagram illustrating a method 1300 for residence-based rating of a phone call. Method 1300 may take place in the environment of a detainee placing a call from a secure facility, similar to some of the preceding flowcharts. Method 1300 begins with the receiving of a destination phone number, via operation 1302. Next, it is determined if the number (and a person associated with that phone number) have been pre-verified (1302). If yes, the call is rated based on a home/billing address of the pre-verified person (1306). If not pre-verified (1302), options may be provided for the called party to become verified (1308). That is, the called party is contacted and provided the options but not yet allowed to communicate with the detainee. In one embodiment, if the called party is not pre-verified, the call may be patched through to the called party (thus allowing for the detainee and called party to communicate) but future calls would not be allowed to occur until the called party becomes verified.

Referring back to operation 1306, as an illustrative, but non-limiting, example, if the called party's billing address is located in Cheektowaga, N.Y. but their number is for their cellphone and they receive the call while physically 10 miles from a secure facility in Hawaii, they are not billed at a rate associated with being 10 miles from the secure facility in Hawaii. Instead, the Cheektowaga, N.Y. address is utilized to rate the call.

Figure 12:
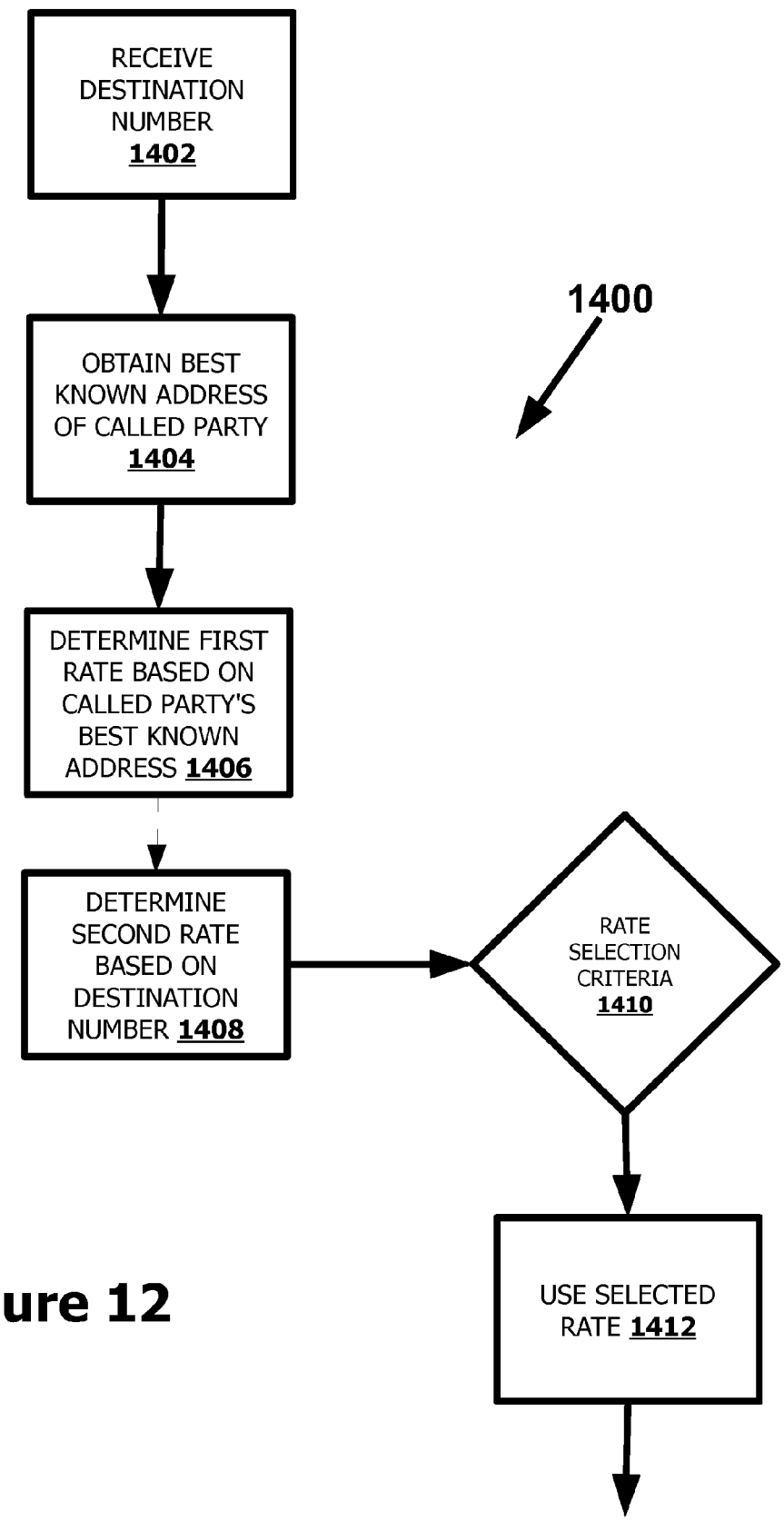

In another embodiment, method 1400, of FIG. 12, illustrates a 'best known address' approach. After a destination number is received (1402), a best known address of the called party is obtained via operation 1404. In one implementation, the address of the called party is obtained via an instant address look-up service based on the destination number. One example of a provider of such a service is the Qtego corporation of Indianapolis, Ind. (http://www.qtego.com/). In other implementations, an actual physical location may be derived of the called party from a mobile device's GPS location or perhaps through the device's IP-address. This is an example of 'geotagging' and for purposes of this disclosure may be considered to be adding available geographic identification metadata to media or more specifically a call data record, in some implementations. The claimed embodiments, however, are not meant to be specifically limited via this definition of 'geotagging.'

The call is then rated using the best known address, or other location, via operation 1406. The call is also rated (1408) based on the destination number, specifically the area code/prefix as that combination relates to a related call origination area. Criteria (1410) is then applied and the selected rate is utilized (1412). In one embodiment, the criteria used at operation 1410 is to decide which rate is cheaper and use the cheaper rate. In another embodiment, the more expensive rate is utilized.

In yet another embodiment, a billing address of a responsible billing party listed in a call data record may be used to rate the call.

In general, but not meant to be limiting in view of the claimed embodiments, ascertaining a best known address and/or a location that a called party, in various implementations, typically receives calls may include billing address from a third party such as a credit card company (if a credit card was involved in a related purchase or even end user-supplied for other reasons) or an instant address lookup service; presentation of identification, or other official document listing a home address, at a visitor kiosk such as kiosk 202 and 500 or presentation of such via other methods (for example—upload of scanned copies via a webpage); when a specific kiosk or set of kiosks are used, utilizing that location(s) as a best known address (perhaps geocoded to a corresponding latitude and longitude location); geocoding in general when an address is correlated to a called party (wherein the determined address is mapped to a corresponding latitude/longitude location); geolocation methods (GPS, IP-address, etc) and also self-identification whether prompted for a location/address as a condition of use or an option to volunteer such information.

While a number of exemplary aspects and embodiments have been discussed above, those of skill in the art will recognize certain modifications, permutations, additions and sub-combinations thereof. It is therefore intended that the following appended claims, and claims hereafter introduced, are interpreted to include all such modifications, permutations, additions and sub-combinations as are within their true spirit and scope.

What is claimed is:

1. A computer-implemented method for rating telephone calls comprising:
    receiving a destination number, of a called party, for a telephone call;
    determining a first rate for the telephone call based on the destination number;
    determining a second rate for the telephone call based on a geotagged phone location of the called party;
    comparing the first rate to the second rate; and
    selecting the first rate or the second rate, based on the comparison, to be billed to the called party.

2. The method as recited in claim 1 wherein the geotagged phone location is GPS-determined.

3. The method as recited in claim 1 wherein the geotagged phone location is IP-address-determined.

* * * * *